Patented Oct. 7, 1947

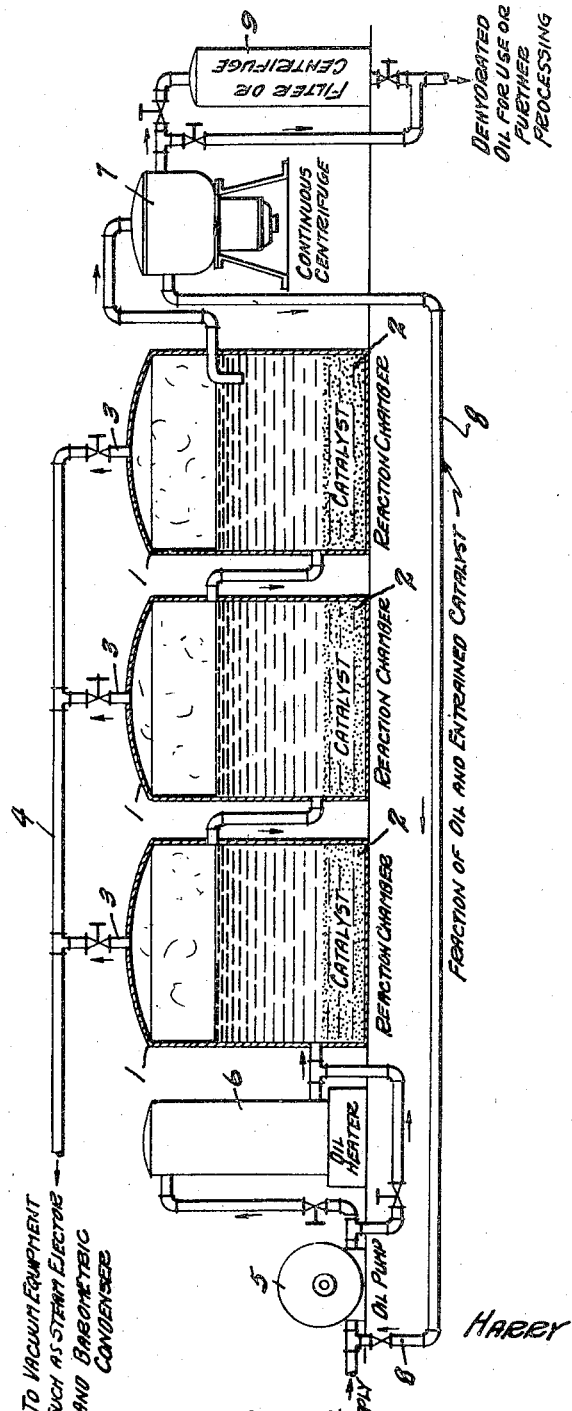

2,428,673

UNITED STATES PATENT OFFICE 2,428,673

DEHYDRATION OF ORGANIC COMPOUNDS BY CATALYTIC ACTION

Harry Miller, Columbia, Mo., assignor to National Agrol Company, Inc., New York, N. Y., a corporation of Delaware Application August 3, 1942, Serial No. 454,105

7 Claims. (Cl. 260—405.5)

This invention relates to a catalytic process and more particularly to a method of removing the elements of water from organic aliphatic esters of high molecular weight by catalytic action. This application is a continuation in part of my pending application Serial No. 303,169, filed November 6, 1939.

One of the objects of my invention is to provide a novel method for removing the elements of water by catalytic action from organic aliphatic esters having at least one hydroxyl group and one hydrogen atom on adjacent carbon atoms.

A further object of my invention is to provide a method of removing one molecule of water from each fatty acid radical contained in the triglyceride of ricinoleic acid present in castor oil.

With these and other objects in view, my invention embraces broadly the concept of removing the elements of water in the proportions to form water from certain types of organic compounds by heating the compound and bringing it into contact with an especially prepared catalyst.

The catalyst used in this process comprises a granular base metal and a promotive oxide in pellet form. The base metal is selected from a group consisting of aluminum, magnesium and beryllium. The promotive oxide comprises an oxide selected from family A of the sixth group of the periodic table, such as an oxide of tungsten, chromium, molybdenum, uranium, and tellurium.

The selected oxide must be capable of partial reduction and the base metal employed must have a lower melting point than the selected oxide to prevent sintering. In this connection, it should be noted that aluminum and magnesium have a lower melting point than any of the oxides of Family A of the Sixth Group of the Periodic Table and, therefore, can be employed with any of the suitable oxides.

In preparing the catalyst, the selected materials are brought into intimate contact by a rubbing action or any other suitable means and the mixture is heated to, or near, the melting point of the base metal.

The contact of the molten base metal with the selected oxide results in the formation of a skeletal core of active metal which penetrates the interstices of the non-sintered particles of the selected oxide to form a catalytic mass of non-sintered individual particles which pour freely and do not lose their original shape.

During the formation of this catalyst, the selected oxide is reduced to form a promotive oxide and a salt is formed by the reaction of a portion of the oxide of the metal of the skeletal core with the active oxide. A substantial portion of the metal of the skeletal core remains free however and serves as a reduction reserve for the partially reduced acidic oxide which is the active promotive agent. For example, if aluminum is selected as a base metal and tungstic trioxide to form the promotive oxide, the aluminum when heated to approximately its own melting point will react with the tungstic trioxide to form a blue oxide of tungsten ($W_2O_5$) and some aluminum tungstate. The remaining free metal together with some aluminum oxide forms a skeletal core structure that preserves the activity of the reduced oxide.

In other words, the aluminum serves to hold the aluminum tungstate in equilibrium with the reduced and unreduced oxides of tungsten, thereby bringing about the constant reduction of the tungstic trioxide into the blue oxide of tungsten. Such a catalyst because of its great activity and the fact that it may be used for long periods without renewal is especially suited for the dehydration of organic compounds such as castor oil. In this connection, however, it should be noted that as total oxidation destroys the property of the catalyst, it is advisable to occasionally subject the catalytic mass to the reductive activity of hydrogen.

The size of the granular particles of the base metal will vary within a range of from 10 to 30 mesh. The proportions of the base metal and promotive oxide will also vary depending upon the metals which are selected. For example, where tungstic anhydride is selected as the promotive oxide and aluminum or beryllium as a base metal, it has been found that the presence of approximately 10% by weight of the anhydride is sufficient.

The catalyst produced by the described process has strong dehydrative properties which are effective from room temperature to approximately 600° C. and are especially effective from approximately 100° to 400° C.

In the drawings:

The single sheet of drawings discloses schematically an apparatus which may be used to practice the present invention.

In general, the present invention relates to a process of dehydrating aliphatic organic esters, having a hydroxyl group and a hydrogen atom on adjacent carbon atoms, by bringing these compounds into contact with the especially selected activated catalyst previously mentioned. In order to obtain maximum dehydration, the material is brought into a series of successive contacts with the catalyst. Immediately after each contact with the catalyst, the newly formed water of dehydration is removed in vapor form.

In order to illustrate my invention, I will now describe my process as adapted to the dehydration of castor oil, it being understood that this process can also be applied to the dehydration of other organic compounds of similar structure, such as esters of lactic acid down to and including butyl lactate. It is also possible that propyl lactate may be dehydrated, but the lactates below propyl are too volatile and must be handled in a vapor phase. The use of these volatile compounds would necessitate a modification in the process to be described.

As shown diagrammatically in the drawing, the equipment used in the dehydration of castor oil and similar oils consists of a series of chambers 1 in each of which is placed the selected dehydrative catalyst 2. The upper portion of each of the chambers 1 is connected by means of ducts 3 with a conduit 4 which leads to a steam ejector and barometric condenser which is not shown. By means of this equipment a partial vacuum can be created within the chambers 1.

In the operation, the oil is forced by pump 5 into a heater 6 where it is heated to a temperature preferably of from 240° to 260° C. and is then passed through the chambers 1. Each chamber discharges into the next one before it actually fills, thereby leaving a space above the oil level in each chamber. A partial vacuum, preferably one which will support twenty-five inches of mercury, is maintained in the chambers.

In passing over the catalyst, one molecule of water is removed from each fatty acid radical in the triglyceride of ricinoleic acid contained in the castor oil. This newly formed water in the form of water vapor leaves the surface of the oil in each chamber and passes out through the vacuum system conduits 3 and 4.

After leaving the last chamber 1, the oil passes through a continuous centrifuge 7 which concentrates the entrained catalyst and returns it by means of the conduit 8 to the oil supply. The remainder of the oil is passed on to any subsequent processes which it may be desired to employ. Any highly subdivided catalyst which may be suspended in this oil may be removed by filtration or further centrifugal action as indicated at 9.

The number of chambers used in the process will vary in accordance with the operative characteristics desired and the substance being treated is fed at a rate which depends on the type of substance being treated and the degree of dehydration desired.

When the process is utilized for the dehydration of castor oil, drying oil having the drying properties approaching those of tung oil is produced which is therefore suitable for paints and varnishes and is also useful for all the other purposes for which tung oil may be employed.

Castor oil is essentially the triglyceride of ricinoleic acid. The formula is $CH_3.(CH_2)_5.CHOH.CH_2.CH=CH.(CH_2)_7-CO-O-CH_2$
$CH_3.(CH_2)_5.CHOH.CH_2.CH=CH.(CH_2)_7-CO-O-CH$
$CH_3.(CH_2)_5.CHOH.CH_2.CH=CH.(CH_2)_7-CO-O-CH_2$ Dehydration of the ricinoleic acid radical at the hydroxyl linkage could result in creating a double bond in one of two places, i. e., (1) $CH_3(CH_2)_4.CH=CH-$
$CH_2CH=CH(CH_2)_7COOR'$ or (2) $CH_3.(CH_2)_5CH=CH-CH=CH.(CH_2)_7COOR'$ (R' indicates the remainder of the triglyceride molecule.)

When the triglyceride of ricinoleic acid is dehydrated in the manner disclosed herein, the iodine value is not materially changed, indicating that the dehydration took place in accordance with Formula 2 above, forming what is termed a conjugated system, that is a system of four carbon atoms with the double bonded carbons separated by a single bonded pair. Conjugated double bonds add halogens in the same proportions as single double bonds.

The following data show the advantage the catalytic pellets described above will display over mixed oxides prepared in the usual manner for the dehydration of castor oil.

| Catalyst | Amount of Catalyst by wt. | Amount of Oil treated in grams | Time, min. | Temp., degrees Centigrade | H₂O removed per cent by wt. of original oil |
|---|---|---|---|---|---|
| Al, Al₂O₃-W₂O₅ pellet | 0.5 | 100 | 20 | 260 | 5.8 |
| Al₂O₃-W₂O₅ ordinary mixture | 0.5 | 100 | 30 | 270 | 4.75 |

The pellet retains its activity during the dehydration of 1000 times its weight of castor oil. Mixed oxides prepared in the usual manner (ordinary mixture above) begin to lose their activity after 500 or 600 times their weight of oil has been dehydrated.

While for purposes of illustration I have described my process as adjusted for the dehydration of castor oil, it is intended that this process should be used for the dehydration of similar organic esters. I, therefore, wish it understood that I intend that this invention be only limited by the prior art and the scope of the appended claims.

I claim:

1. The method of dehydrating an oil consisting essentially of glyceryl esters of ricinoleic acid, comprising heating the ester to a temperature of from 100° to 600° C. and then bringing the organic compound into contact with a catalyst comprising a skeletal core of a base metal selected from the group consisting of aluminum, magnesium and beryllium which is positioned within the interstices of the non-sintered particles of a partially reduced oxide selected from the elements of family A of the sixth group of the periodic table, said skeletal core serving as a reduction reserve against the oxidation of the said partly reduced oxide.

2. The method of dehydrating castor oil comprising heating the castor oil to a temperature within a range of from 100° to 600° C. and then bringing the heated oil into contact with a catalyst comprising a skeletal core of a base metal selected from the group consisting of aluminum, magnesium and beryllium which is positioned within the interstices of the non-sintered particles of a partially reduced oxide selected from the elements of family A of the sixth group of the periodic table, said skeletal core serving as a reduction reserve against the oxidation of the said partly reduced oxide.

3. The method of dehydrating castor oil comprising heating the castor oil to a temperature within a range of from 240° to 260° C. and then bringing the heated oil into contact with a catalyst comprising a skeletal core of a base metal selected from the group consisting of aluminum, magnesium and beryllium which is positioned within the interstices of the non-sintered particles of a partially reduced oxide selected from the elements of family A of the sixth group of the periodic table, said skeletal core serving as a reduction reserve against the oxidation of the said partly reduced oxide.

4. The method of dehydrating castor oil comprising heating the castor oil to a temperature within a range of from 100° to 600° C. and then bringing the heated oil into a series of successive contacts with a catalyst comprising a skeletal core of a base metal selected from the group consisting of aluminum, magnesium and beryllium which is positioned within the interstices of the non-sintered particles of a partially reduced oxide selected from the elements of family A of the sixth group of the periodic table, said skeletal core serving as a reduction reserve against the oxidation of the said partly reduced oxide.

5. The method of dehydrating castor oil comprising heating the castor oil to a temperature within a range of from 240° to 260° C. and then bringing the heated oil into a series of successive contacts with a catalyst comprising a skeletal core of a base metal selected from the group consisting of aluminum, magnesium and beryllium which is positioned within the interstices of the non-sintered particles of a partially reduced oxide selected from the elements of family A of the sixth group of the periodic table, said skeletal core serving as a reduction reserve against the oxidation of the said partly reduced oxide.

6. The method of dehydrating castor oil comprising heating the castor oil to a temperature within a range of from 240° to 260° C., bringing the heated oil into a series of successive contacts with a catalyst and then removing the newly formed water vapor by vacuum after each successive contact, said catalyst comprising a skeletal core of a base metal selected from the group consisting of aluminum, magnesium and beryllium which is positioned within the interstices of the non-sintered particles of a partially reduced oxide selected from the elements of family A of the sixth group of the periodic table, said skeletal core serving as a reduction reserve against the oxidation of the said partly reduced oxide.

7. The method of dehydrating castor oil comprising heating the castor oil to a temperature within a range of from 100° to 600° C., bringing the heated oil into a series of successive contacts with a catalyst and then removing the newly formed water vapor by vacuum after each successive contact, said catalyst comprising a skeletal core of a base metal selected from the group consisting of aluminum, magnesium and beryllium which is positioned within the interstices of the non-sintered particles of a partially reduced oxide selected from the elements of family A of the sixth group of the periodic table, said skeletal core serving as a reduction reserve against the oxidation of the said partly reduced oxide.

HARRY MILLER.

REFERENCES CITED

The following references are of record in the file of this patent:

UNITED STATES PATENTS

| Number | Name | Date |
|---|---|---|
| 1,374,589 | Levey | Apr. 12, 1921 |

FOREIGN PATENTS

| Number | Country | Date |
|---|---|---|
| 317,391 | Great Britain | June 16, 1930 |
| 830,494 | France | May 16, 1938 |